United States Patent [19]

Fortier

[11] Patent Number: 5,752,026
[45] Date of Patent: May 12, 1998

[54] EARLY COMMIT LOCKING COMPUTER DATABASE PROTOCOL

[75] Inventor: Paul J. Fortier, Portsmouth, R.I.

[73] Assignee: The United States of America as represented by the Secretary of the Navy, Washington, D.C.

[21] Appl. No.: 238,045

[22] Filed: Apr. 28, 1994

[51] Int. Cl.$^6$ ............................ G06F 17/30; G06F 17/60
[52] U.S. Cl. ...................... 395/614; 395/608; 395/207; 395/726
[58] Field of Search ........................ 395/600, 650, 395/725; 364/200

[56] References Cited

U.S. PATENT DOCUMENTS

| | | | |
|---|---|---|---|
| 4,881,166 | 11/1989 | Thompson et al. | 364/200 |
| 5,193,188 | 3/1993 | Franaszek et al. | 395/650 |
| 5,269,020 | 12/1993 | Kakimoto | 395/600 |
| 5,280,619 | 1/1994 | Wang | 395/725 |
| 5,414,839 | 5/1995 | Joshi | 395/600 |
| 5,459,871 | 10/1995 | Van Den Berg | 395/650 |

Primary Examiner—Thomas G. Black
Assistant Examiner—Cheryl Lewis
Attorney, Agent, or Firm—Michael J. McGowan; James M. Kasischke; Prithvi C. Lall

[57] ABSTRACT

A computer database method wherein the data is organized into atomic data sets and transactions are separated into projections which operate on only one atomic data set. Multiple transactions can thereby access the same atomic data set using a locking protocol wherein locks are held by each projection. On access to a data item, the system detects existing locks. If locks are not found, the system locks the data and performs the access. When existing locks are found the system delays execution of the command and determines if a deadlock is present. To recover from a deadlock, related projections are merged together and reexecuted. The system merges related projections from other transactions and reexecutes if the deadlock continues. When the deadlock continues after execution of the above steps, a victim projection is chosen and aborted. The victim projection is restarted after commit of the conflicting projection.

5 Claims, 4 Drawing Sheets

|  | BT |  |
|---|---|---|
| $S_0$: | sb(A) |  |
| $S_1$: | $v_1 := r(a)$ ⎤ |  |
| $S_2$: | $v_2 := r(b)$ ⎟ | $\pi_A(T)$ |
| $S_3$: | $v_3 := r(c)$ ⎦ |  |
| $S_4$: | sb(B) |  |
| $S_5$: | $v_4 := r(d)$ ⎤ |  |
| $S_6$: | $v_4 := f_i(v_1, v_2, v_3)$ ⎦ | $\pi_B(T)$ |
| $S_7$: | sc(A) |  |
| $S_8$: | $w(d, v_4)$ ] | $\pi_B(T)$ |
| $S_9$: | sc(B) |  |
|  | ET |  |

FIG. 2

Transaction T

```
parbegin
    begin
        sb_A
            v_1 := r(x)
        sc_A
    end
    begin
        sb_B
            v_2 := r(y)
        sc_B
    end
    begin
        sb_C
            v_3 := r(z)
        sc_C
    end
parend
```

FIG. 3

| Step | Transactions | | Waits-for graph | |
|---|---|---|---|---|
| | $T_1$ | $T_2$ | ADS A | ADS B |
| 1 | $w(a, v_a)$ | $w(b, v_b)$ | $\pi_A(1)$ <br> ↓ | $\pi_B(2)$ <br> ↓ |
| 2 | $v_b := r(b)$ | $v_a := r(a)$ | $\pi_A(2)$ | $\pi_B(1)$ |

FIG. 5

EARLY COMMIT LOCKING COMPUTER DATABASE PROTOCOL

STATEMENT OF GOVERNMENT INTEREST

The invention described herein may be manufactured and used by or for the Government of the United States of America for governmental purposes without the payment of any royalties thereon or therefor.

CROSS REFERENCE TO RELATED PATENT APPLICATIONS

This patent application is co-pending with four related patent applications entitled Early Commit Timestamp Computer Database Protocol, Ser. No. 08/238,033; U.S. Pat. No. 5,530,851; Early Commit Optimistic Projection-Based Computer Database Protocol, Ser. No. 08/238,036; U.S. Pat. No. 5,561,794; Merge, Commit Recovery Protocol for Real-time Database Management Systems, Ser. No. 08/236,900; U.S. Pat. No. 5,497,487; and Replay Recovery Protocol for Real-time Database Management Systems, Ser. No. 08/238,034; U.S. Pat. No. 5,524,239; all by the same inventor and filed on the same date as subject patent application.

BACKGROUND OF THE INVENTION

(1) Field of the Invention

The present invention relates to a computer database method for providing an early database commit while increasing database concurrency and limiting cascading aborts to minimize the impact on recovery for a decomposed database and transaction system.

(2) Description of the Prior Art

Real-time command, control and communications ($C^3$) systems control physical systems by extracting data from sensors, processing the extracted data, and performing control actions based on this processed data. Real-time $C^3$ systems are applied to applications where timeliness of data access, data processing and reactive responses are critical to the applications successful operations.

Real-time $C^3$ systems are being applied to a wide variety of physical systems, such as automotive control, aircraft control, spacecraft control, power management, automated factories, medical assistance and defense oriented systems. The main function of real-time $C^3$ systems is to manage and utilize information to control the real world environment. Therefore, these systems can be viewed as large information management systems that must respond in predictable ways and within specified time frames.

Real-time $C^3$ systems differ from conventional, general purpose systems in the sense that consistency and correctness of the real-time systems operation is dependent on the timeliness and predictability of responses to the controlled processes activities. In a real-time $C^3$ system, information is repeatedly collected from the physical system. Collected information is sampled, converted, formatted, timestamped and inserted into the control computer's database for each sampling period of the systems sensors. Stored data must be provided to the control software and system operators to be acted on to produce some desired control action.

Once the data is inserted into the database, it is used to compute a variety of related parameters. For example, raw sensor inputs from a radar system can be read and reduced to a bearing, range, and speed. These data items in turn can be used to compute detailed tracks of contacts, allowing for long-term tracking of an object. In addition, the raw information can be used to compute a profile on an object being tracked. This makes possible the classification and identification of an observed object. Transactions written to accomplish these computations require predictable and correct access, but not necessarily serializable access.

Real-time computing systems are being applied to a greater variety of control applications that require timely information.

Researchers are looking towards real-time computer systems as an emerging and important discipline in computer science and engineering. The real-time systems are characterized as possessing time dependent operations, reliable hardware and software, synergy with the controlled environment, predictable service. Predictability should be maintained not only in task scheduling, but also in scheduling all assets such as input/output, processing, communications, storage, and specialized controllers.

Databases within real-time systems must satisfy not only database consistency constraints but also timing constraints associated with transactions.

Responsive real-time databases must be predictable yet timely in their service. Real-time databases must incorporate features from real-time operating systems schedulers. A means to select the most appropriate database action to perform is necessary, and the scheduler must be adaptive to an ever changing real-time systems state. For correct database operations, real-time schedulers must be integrated with high performance concurrency control algorithms.

Recovery techniques based on rollback are not adequate in a real-time environment nor are present concurrency control techniques based on locking due to added blocking delays. Transactions must use non-serializable techniques, embedded transaction semantic knowledge, decomposition of transactions and the database to form more concurrent executions.

Transactions represent the unit of work recognized by users as being atomic. "Atomic" meaning that the operation or operations must be complete execution or be aborted all together. Transactions serve the dual purpose as the unit for concurrency and recovery in database systems. Concurrency provides for indivisible access to data objects by concurrently executing users; and recovery provides for data restoration due to hardware, software, and transaction failures.

Due to these properties researchers look towards the use of transactions as a tool for structuring computations in distributed systems.

Research into transaction decomposition is relatively new; however, researches have studied breaking transactions into nested elementary transactions to increase concurrency. One approach to this is to decompose transactions into disjointed operations separated by breakpoints which breakpoints define allowable interleaving to allow increased concurrency. Another approach is to decompose transactions into data flow graphs of transaction computations steps which can be optimized to increase performance.

The data itself can also be decomposed into atomic data sets (ADS) to allow a more concurrent execution of decomposed transaction steps. Many researchers indicate that a finer granularity on data objects can increase data concurrency if managed properly. Availability and timeliness of data and processing has been pointed out as being a desirable feature in real-time database management systems and may be more important that consistency. Thus, the cited research indicates using transaction decomposition, database decomposition, and parallel and concurrent execution of database actions to provide for increased performance.

Concurrency control is used to ensure database consistency while allowing a set of transactions to execute concurrently. The problem solved by concurrency control is to allow non-interfering readers and writers free access, while controlling and coordinating the actions of conflicting readers and writers. There are three basic concurrency control approaches for transaction processing in database systems: locking, timestamp ordering and optimistic. The basic concurrency control techniques rely on syntactic information to make concurrency control decisions. The correctness of the algorithms is based on serializability theory.

These concurrency control techniques are inherently pessimistic. They avoid conflicts by enforcing serialization of conflicting database actions. Prior art literature points out that serializability as a correctness criteria is to stiff a requirement for real-time systems. Real-time concurrency control algorithms, must integrate real-time scheduling algorithms with concurrency control techniques.

Semantic information about transactions can be used to develop non-serializable scheduling of transaction steps that nonetheless are correct executions. A prior art method using this breaks transactions into a collection of disjoint classes. Transactions that belong to the same class are compatible allowing for arbitrary interleaving, whereas transactions that belong to different classes are incompatible and cannot interleave. Another prior art method defines a scheme wherein the transaction writing system decomposes transactions into steps upon which concurrency control can be performed. Transactions are broken at breakpoints, and type classes defined on the breakpoints. Transactions of compatible classes can interleave at this point, others cannot. A further refinement of this technique is achieved by using a larger volume of transaction class types which results in a finer granularity of breakpoints. This system increases concurrency by adopting a looser definition of correctness than serializability.

Other prior art research suggests the use of decomposition of both transactions and the database into finer granules to increase concurrency. In this theory the database and transactions are decomposed into atomic data sets (ADS) and elementary transactions respectively. Elementary transactions are executed concurrently on distributed assets of an ADS. This theory suggests that if elementary transactions are serialized with respect to an ADS then correct and consistent database executions result.

The aforementioned schemes do not address the issues in management of real-time data which are driven by the needs of the overall system, based on criticality of operations, nature of deadlines, and timing requirements. This paper develops and presents transaction concurrency control algorithms for real-time systems, based on decomposition of both the database and individual transactions, along with the application of criticalness, deadlines, and timing requirements to improve real-time database systems performance and predictability.

SUMMARY OF THE INVENTION

Accordingly, it is a general purpose and object of the present invention to provide a method for operation of a real-time database system.

It is a further object that such real-time database system provide a high degree of concurrency.

Another object is that such system avoid transaction errors when possible and provide recovery when forced to abort an operation.

These objects are accomplished with the present invention by providing a computer database method wherein the data is organized into atomic data sets and transactions are separated into projections which operate on only one atomic data set. Multiple transactions can thereby access the same atomic data set using a locking protocol wherein locks are held by each projection. On access to a data item, the system detects existing locks. If locks are not found, the system locks the data and performs the access. When existing locks are found the system delays execution of the command and determines if a deadlock is present. To recover from a deadlock, related projections are merged together and reexecuted. The system merges related projections from other transactions and reexecutes if the deadlock continues. When the deadlock continues after execution of the above steps, a victim projection is chosen and aborted. The victim projection is restarted after commit of the conflicting projection.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein:

FIG. 1 shows an example of a transaction before it is broken into projections;

FIG. 2 shows an example of a transaction that is broken into projections;

FIG. 3 shows pseudocode for a transaction having multiple projections;

FIG. 5 shows an example transaction and a waits-for graph for that transaction.

DESCRIPTION OF THE PREFERRED EMBODIMENT

Figure 4:
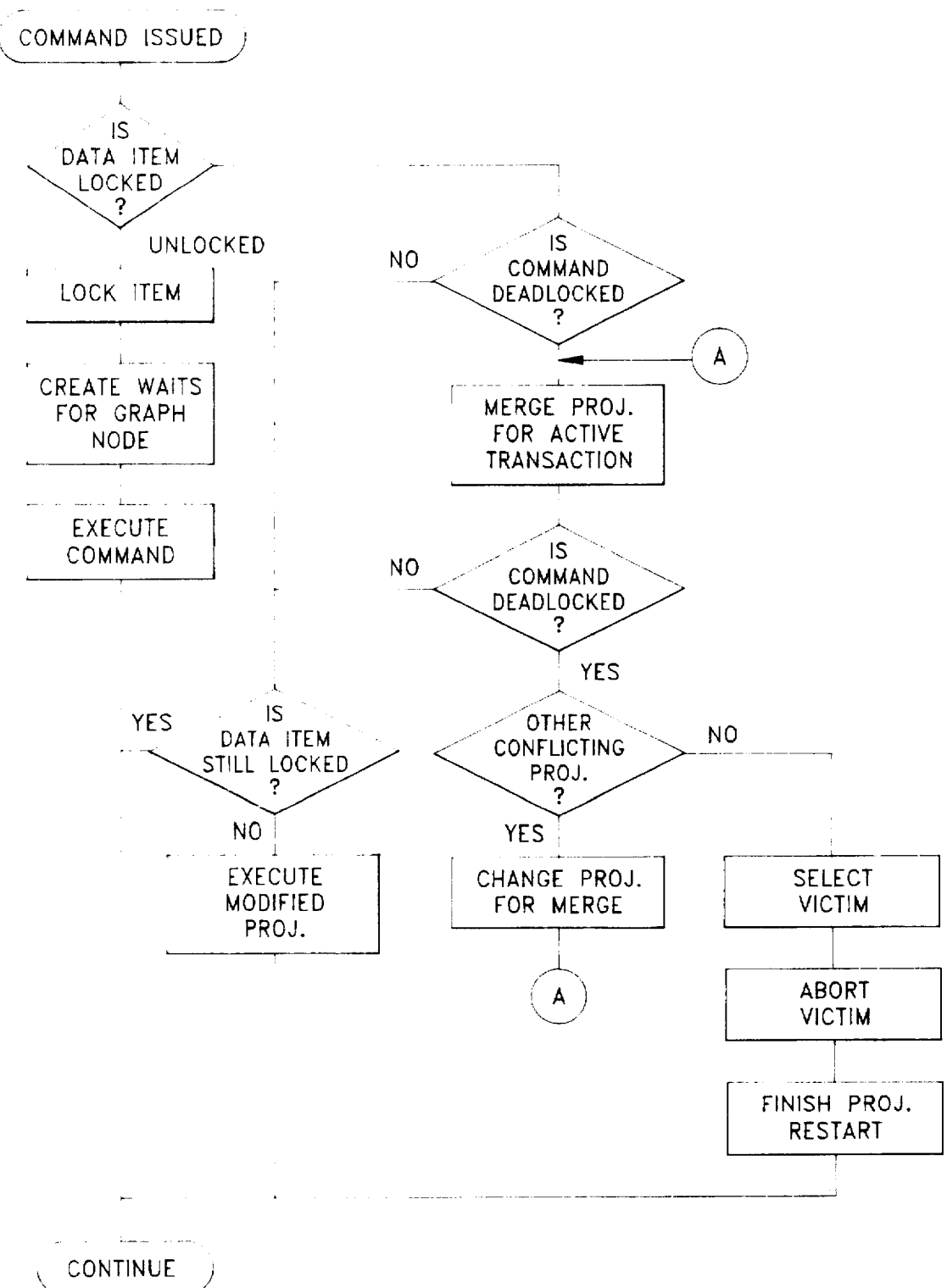
FIG. 4 shows a flow chart of the command execution process of the early commit locking protocol of the current invention.

Database systems manage formatted collections of shared data. The database consists of collections of data fields, which are the finest granularity of data units available for users to manipulate. A data field is a basic data type such as name, age, address, etc. These basic data fields are organized into data items. Data items are the units for managing concurrency. Data items are not nested inside each other. Data items can be in the form of conventional records or objects. In this application the terms "item" and "record" are used interchangeably.

Relationships in the form of mathematical predicates are defined over items of the database. These predicates restrict the altering of database data items and structures. Database consistency means that all constraints are true. Constraints have the general form of predicates on database items. Constraints between data items of the database describe how database structures and items can be manipulated.

Constraints on database items are used to decompose the database into atomic data sets (ADSs). The database is a set of data items. Let $i_1$, $i_2$ be two distinct items from the set of database items. Let constraint, $C(i_1, i_2)$, hold if there is a constraint that refers to $i_1$ and $i_2$. Let C' denote the transitive and reflexive closure of C. The closure of constraints forms equivalence relations. The equivalence relations induced by C' are called atomic data sets (ADSs). Consistency is maintained on each ADS in isolation from other ADSs.

Transactions define logical units of work on the database. Transactions have a lower bound (begin transaction, BT) and an upper bound (end transaction, ET) defining boundaries for transaction management. Between boundaries, transactions enclose operations on the database of the form: read a data item x, r(x) or write a data item x, w(x), and transaction code.

For example, consider the transaction of FIG. 1. Let $v_1$, $v_2$, $v_3$, and $v_4$ be variables of transaction T. Let a,b,c, and d be data items from an ADS. Execution of statement $S_6$: w(d, $V_4$) causes the variable $V_4$ to be written to the data item d. Statement $S_1$: $v_1$:=r(a) represents a read from data item a into variable $v_1$. The reading of a data item into a variable defines the variables value. Statement $S_5$ is an assignment statement. Assignment statements use variables to define new or existing variables. Statements of this type are of the form $v_0$:=f(vlist) where vlist represents a set of variables used in computing $v_0$ and f is a function performed over vlist. $S_5$ applies function $f_i$ using variables $v_1$, $v_2$, and $v_3$ to define variable $v_4$.

The conventional transaction model is extended to include boundaries on atomic data set accesses. These boundaries are formed on the initiation of access and termination of access to an atomic data set. The first request is preceded by a subbegin marker (sb) indicating the lower bound of access by this transaction on a named ADS. Terminate can be either a subabort (sa) or subcommit (sc) operation indicating the upper bound of access by this transaction on a named ADS.

A transaction accessing an ADS A, acquires resources in A as needed and releases resources once the last access to ADS A is performed. Transaction writers define when the first access to ADS A occurs and when the last access is performed. Boundaries for projections are formed using subbegin and subterminate statements.

After the last access to ADS A, a transaction cannot acquire more data items from ADS A. In this fashion the access and manipulation of ADS A, between the initial request for access until the final access forms a projection upon which concurrency control can be enforced. A projection $\pi_A(i)$ contains all accesses to ADS A from transaction $T_i$ and none from any other transaction.

An example of projections from a transaction is shown in FIG. 2. In this example A and B are individual ADSs. Let a, b, and c be items from these ADS A, and d be an item from ADS B. Access to items in ADS A are bound in between sb(A) and sc(A), or sa(A), and, likewise, accesses to ADS B are bound between sb(B) and sc(B), or sa(B). A statement that reads a data item defines the variable the data item is read into. A read statement is in the projection controlling access to the data item read.

In the example of FIG. 2, statements $S_1$, $S_2$, $S_3$ define local variables $v_1$, $v_2$, and $v_3$ by reading ADS A data items a, b, and c into these variables. Statements $S_1$, $S_2$, and $S_3$ are in projection $\pi_A$ since variables $v_1$, $v_2$, and $v_3$ are defined by reading data items from ADS A. Statement $S_5$ defines variable $v_4$ by reading data item d from ADS B into $v_4$. Statement $S_5$ is in $\pi_B$ by reading a data item from ADS B.

A statement that writes a data item defines the data item. A write statement is in the projection controlling access to the data item written. In the example of FIG. 2 statement $S_6$ defines data item d of ADS B when it performs the write operation w(d, $v_4$) ; therefore, statement $S_6$ is in projection $\pi_B$.

A statement, S directly depends on a statement S' if S follows S' and S uses at least one variable defined by S'. In the example of FIG. 2, assignment statement $S_5$ defines variable $V_4$ by performing a function f on variables in projection $\pi_A$. Since statement $S_5$ uses variables from statements $S_1$, $S_2$ and $S_3$, $S_5$ directly depends on $S_1$, $S_2$ and $S_3$.

A statement S depends on a statement S' if S directly depends on S', or there is a statement S* such that S directly depends on S* and S* depends on S'. In the example of FIG. 2, write statement $S_8$ writes data item d using variable $v_4$. Variable $v_4$ was defined in $S_5$, therefore $S_8$ depends on $S_5$. In addition since $S_5$ directly depends on $S_1$, $S_2$ and $S_3$, $S_8$ depends on $S_1$, $S_2$ and $S_3$.

A projection accesses data items outside of its boundaries by using statements in siblings. A projection $\pi$ that uses statements that are in or depend on a sibling $\pi'$, depend on $\pi'$. In FIG. 2, statements $S_5$ and $S_6$ are in projection $\pi_B$, and statements $S_1$, $S_2$ and $S_3$ are in $\pi_A$. Statement $S_6$ uses variable $V_4$ defined by statement $S_5$ which depends on statements $S_1$, $S_2$ and $S_3$. Since $S_6$ depends on $S_5$ and $S_5$ depends on statements in $\pi_A$, then $\pi_B$ depends on $\pi_A$.

A projection $\pi$ that depends on a sibling $\pi'$ cannot commit until $\pi$ commits. In FIG. 2 projection $\pi_B$ cannot commit until projection $\pi_A$, is ready to commit. The delaying of commit will maintain the correctness of executions in the face of failures.

Projections act independently on ADS's. A projection acts on a single ADS reading data items into variables, using variables to perform computations and to define variables and data items. If no interaction with sibling projections occur the projection can commit. If a projection uses a sibling's variables, it depends on the sibling projection. Dependent projections must wait for siblings to commit to do likewise. A projection that depends on no siblings need not delay. In FIG. 2, projection $\pi_A$ can commit when ready since it does not depend on $\pi_B$ or any other sibling. Projection $\pi_B$ must delay commit until $\pi_A$ commits, since $\pi_B$ depends on $\pi_A$. Correct and consistent execution results if projections of a transaction coordinate in this fashion.

Projections from distinct transactions cannot use variables defined within other transactions. For correct and consistent execution, projections from distinct transactions must be committed serializably with each other on individual atomic data sets.

A projection $\pi_A(i)$ from a transaction $T_i$ and a projection $\pi_A(j)$ from another transaction $T_j$ that act on the same ADS A must execute such that, the effects of the concurrently executing projections on the database either precede or follow each other. In the above example, projection $\pi_A(i)$ of $T_i$ either precedes execution of projection $\pi_A(j)$ of $T_j$ or $\pi_A(i)$ follows the execution of projection $\pi_A(j)$. The correct execution of conflicting projections is determined by formation of projection schedules for each atomic data set and checking if the schedules are serializable.

Conventional two-phase locking breaks execution into two phases, lock acquisition and lock release. In the first phase, the growing phase, transactions acquire locks on database items as needed. Once a transaction completes execution, it enters the second phase, the shrinking phase, when transactions release locks. A transaction that has released its locks cannot acquire more locks.

Locks are requested from the lock manager. If locks are not already held on an item or requested locks are compatible with those held, locks are granted. If the lock manager cannot grant a request, the requesting transaction is placed in a wait state. Upon releasing a lock, waiting transactions are unblocked.

In two-phase locking, deadlocks can occur and must be detected or avoided. The locking protocol disclosed herein detects deadlocks. When a transaction initially accesses an ADS, a node in the transaction waits-for graph is created. The waits-for graph is periodically tested for cycles. If deadlock is detected, a victim is chosen and aborted.

In the early commit locking protocol, sets of locks can be released during different stages of a transaction's execution. A transaction acquires a lock on a data item before that transaction's first access to the data item and releases the lock when access to an ADS is complete. Locks cannot be acquired or reacquired on an ADS by a transaction that has released locks on the ADS.

Primitives such as lock request and lock release are the same as in conventional locking approaches. The difference is in the duration of lock holding and lock acquisition being performed separately for each ADS. A projection $\pi_A$ requests locks from ADS A for reads and writes to a data item in A. Conflicts on locks cause waiting as in conventional system, though the duration of the wait may be shorter since waits are on ADSs instead of large monolithic databases.

Another difference from conventional systems occurs when deadlock is detected. Failed transactions are not totally aborted, only projections conflicting with the deadlocked transaction's projections on the same ADS are aborted. In discussing this protocol, let T be a transaction identifier, x be a data item. As used hereinafter, subterminate represents a subcommit or subabort operation. Transaction T operates by requesting locks on data items using read data item x, r(x), or write data item x, w(x), operations. On the last access to an ADS A, a transaction releases locks using a subterminate command, subcommit, $sc_A$, or subabort, $sa_A$. The example in FIG. 3, performs access to three atomic data sets ADS A, ADS B, and ADS C using parallel executions. Data item x is in ADS A, data item y is in ADS B, and data item z is in ADS C. The execution of these three projections can be performed nonserializably with other transactions' projections on the same ADSs. Given that $\pi_1$ represents all accesses to ADS A from transaction T, $\pi_2$ accesses to ADS B, and $\pi_3$ accesses to ADS C. $\pi_1$, $\pi_2$ and $\pi_3$ can be executed concurrently if no depends-on relationships exist between the projections.

Referring now to FIG. 4, there is shown a flow chart for the command execution process of the early commit locking protocol. Locks are managed for each atomic data set separately. If no locks are held on any of the atomic data sets then all three accesses can be handled concurrently. If locks are held on one of the atomic data sets requested then only that projection is delayed, not the entire transaction. In the above example projection $\pi_1$ acting on ADS A can perform its access and commit even if projection $\pi_2$ acting on ADS B and projection $\pi_3$ acting oil ADS C are forced to wait until locks on data items in ADS B and ADS C are released. This allows other transactions to access AD', A before transaction T commits, increasing concurrency.

The lock manager receives lock requests from transactions. If the request does not conflict with held locks, the request can be granted. If a lock cannot be granted, the requester's projection is blocked and an edge is added to the waits-for graph. The waits-for graph is checked for cycles. If cycles are found, the requester's transaction is selected as a victim, restarted, releasing held data items for other projections' use.

For example, in FIG. 5, if two transactions $T_1$ and $T_2$ execute on the same ADSs, a deadlock between transactions $T_1$ and $T_2$ exists in a conventional database, while no deadlock exists in the disclosed early commit locking protocol. In this example, a lock by a projection is represented as $\pi_X(Y)$ where X is the ADS being locked and Y is the transaction locking the projection. In the example, A and B are distinct ADSs with variable a being in ADS A and b being in ADS B. In step one of this example, execution of the w(a, $v_a$) statement in $T_1$ causes the system to create a node $\pi_A(1)$ in the waits-for graph representing the lock acquired on data item a in ADS A. Another node, $\pi_B(2)$, is created by the execution of the w(b, $v_b$) statement in $T_2$. At step two, $T_1$ attempts to execute $v_b:=r(b)$ causing the lock manager to attempt to place a lock on data item b in ADS B. Because a lock is already held because of $T_2$'s statement in step one, the lock manager does not allow the lock. No cycles are detected so the system inserts a node $\pi_A(2)$ and an edge 1 in the waits-for graph and waits for the lock to be released before executing the statement. The $T_2$ statement, $v_a:=r(a)$, attempts to execute but is also delayed; however, the system detects cycling indicating a deadlock.

In the inventive protocol, deadlocks are resolved by merging waits-for graph nodes from the same transaction into a single node when there are depends-on relationships between sibling projections. In FIG. 5, $\pi_A(1)$ and $\pi_B(1)$ are merged into a single node because, as indicated by the cycling, $\pi_A(1)$ depends on $\pi_B(1)$. The merged graph is again examined for cycles. Since in this case there is an edge between new node $\pi_{A,B}(1)$ and $\pi_B(2)$, and another single edge between $\pi_A(2)$ and merged node $\pi_{A,B}(1)$, no cycles are found, and no further action is required. $\pi_B(2)$ commits allowing projection $\pi_B(1)$ to acquire needed data items and to commit. Once the combined projections commit waiting projection $\pi_A(2)$ can acquire needed data items and also commit.

If, in addition to the data use dependencies between sibling projections of transaction $T_1$, there is a depends-on relationship between sibling projections of transaction $T_2$ then the system merges projection $\pi_A(2)$ and projection $\pi_B(2)$ into a single node. The reduced waits-for graph is reexamined for cycles. If cycles continue to exist, a projection must be aborted. The system call be optimized to abort the projection which is farthest from commit, the projection which is least critical, or the projection which has spent the least time in processing. After commit of the conflicting projection, the aborted projection can be restarted.

The mechanisms to construct an early commit locking protocol are the same as in conventional locking systems. Accesses are controlled by lock and unlock operations. The difference is in how lock tables are used and controlled. Locks are maintained as a set of lock tables with each ADS having a single table representing the locks held on the ADS's data items.

All requests for locks and unlocks are sent to the appropriate ADS lock table. Entries in the lock table are examined on all lock requests to compute if the request can be satisfied. If a request can be satisfied, requested locks are set and the requested operation is performed. The table for each ADS is maintained in its master pointer block in the ADS index, as an extra field in the index entries. To maintain the correct status of locks, the new master index must possess the same settings for locks on commit. This is accomplished by making the copying of lock settings part of the commit process. Until all locks have been set in the committing projections copy index, the master is maintained as the prime index. When the committing projections copy index is ready, the master pointer is updated to point to the new master, the committing projection copy index.

The early commit locking protocol of this invention differs from conventional protocols in fundamental ways. The database is composed of a collection of atomic data sets instead of a single monolithic database. Each ADS maintains consistency in isolation from other ADSs. Transaction operations are partitioned over ADSs. Each transaction's collection of operations on an ADS constitutes a projection of these operations over the ADS. Projections from distinct transactions operate on individual ADS serializably. Locking is handled on a projection basis using a waits-for graph to detect and recover from transaction errors.

The advantages of the present invention over the prior art are that the early commit locking protocol allows multiple transactions to be executed concurrently using the same atomic data set. Transaction errors are avoided by merging projections before the projections are aborted. A projection is aborted only if merging and rescheduling cannot resolve the error.

Obviously many modifications and variations of the present invention may become apparent in light of the above teachings. In light of the above, it is therefore understood that within the scope of the appended claims, the invention may be practiced otherwise than as specifically described.

What is claimed is:

1. A computer database method comprising the steps of:

organizing data items into atomic data sets;

breaking down each transaction containing a plurality of statements operating on said data items into at least one projection having statements which operate on only one said atomic data set;

issuing commands by said projections, said commands comprising read commands, write commands, and projection delimiting commands;

allowing multiple transactions to access said atomic data set;

detecting preexisting locking for a data item upon issuance of either a read command or a write command;

locking said data items from said atomic data set upon issuance of either a read command or a write command when no preexisting lock is detected;

unlocking said data items from said atomic data set upon completion of the projection issuing said locking command;

determining the existence of a deadlock and related projections in the current transaction when a preexisting lock on said data item is detected;

delaying execution of said issued command until said preexisting lock is unlocked;

merging said related projections in said current transaction upon determination that said deadlock exists;

executing said transaction with said merged projections in said current transaction;

determining the existence of a deadlock and related projections in the other transactions when a preexisting lock on said data item is detected after merging said related projections in said current transaction;

merging said related projections in said other transaction upon determination that said deadlock exists;

executing said transaction with said merged projections in said current transaction and in said other transactions;

determining the existence of a deadlock when a preexisting lock on said data item is detected after merging said projections in said other transactions;

choosing a victim projection for abort after determining that a deadlock exists after merging said projections in said other transactions; and aborting execution of said victim projection.

2. The method of claim 1 further comprising the steps of:

building a waits for graph for said atomic data set upon issuance of commands to said atomic data set, said steps of determining the existence of a deadlock comprising analyzing said waits for graph to determine the existence of cycles, said cycles indicating a deadlock; and removing said completing projection commands from said waits for graph on completion of said projection.

3. The method of claim 2 wherein said chosen victim projection is the most recently started projection.

4. The method of claim 2 wherein said chosen victim projection is the active projection farthest from commit.

5. The method of claim 1 wherein said step of organizing data items into atomic data sets comprises the steps of:

establishing constraints regarding the fields and the records required to be in an atomic data set; and generating an atomic data set from said data items in accordance with said established constraints.

* * * * *